(12) United States Patent
Lin et al.

(10) Patent No.: US 12,660,001 B2
(45) Date of Patent: Jun. 16, 2026

(54) METHOD FOR DATA TRANSMISSION AND TERMINAL DEVICE

(71) Applicant: GUANGDONG OPPO MOBILE TELECOMMUNICATIONS CORP., LTD., Dongguan (CN)

(72) Inventors: Xue Lin, Dongguan (CN); Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 492 days.

(21) Appl. No.: 18/319,128

(22) Filed: May 17, 2023

(65) Prior Publication Data

US 2023/0292375 A1 Sep. 14, 2023

Related U.S. Application Data

(63) Continuation of application No. PCT/CN2021/070666, filed on Jan. 7, 2021.

(51) Int. Cl.
*H04W 74/0833* (2024.01)
*H04W 74/0836* (2024.01)

(52) U.S. Cl.
CPC .... *H04W 74/0833* (2013.01); *H04W 74/0836* (2024.01)

(58) Field of Classification Search
None
See application file for complete search history.

(56) References Cited

U.S. PATENT DOCUMENTS

| | | | | |
|---|---|---|---|---|
| 2019/0132862 A1* | 5/2019 | Jeon | | H04W 72/0453 |
| 2022/0007423 A1* | 1/2022 | Agiwal | | H04W 74/0833 |
| 2022/0022247 A1* | 1/2022 | Agiwal | | H04W 72/0453 |
| 2022/0022266 A1* | 1/2022 | Agiwal | | H04W 74/004 |
| 2022/0086899 A1* | 3/2022 | Shih | | H04L 5/0053 |
| 2022/0201659 A1* | 6/2022 | Agiwal | | H04W 72/23 |
| 2023/0292375 A1* | 9/2023 | Lin | | H04W 74/0833 |
| 2025/0048336 A1* | 2/2025 | Agiwal | | H04W 72/04 |
| 2025/0159733 A1* | 5/2025 | Agiwal | | H04W 72/02 |

FOREIGN PATENT DOCUMENTS

CN 110324809 10/2019

OTHER PUBLICATIONS

EPO, Extended European Search Report for EP Application No. 21916774.9, Nov. 8, 2023.
ETSI MCC, "Report of 3GPP TSG RAN WG2 meeting #111-e Online," 3GPP TSG-RAN WG2 meeting #112-e, R2-2008701, Aug. 2020.

(Continued)

*Primary Examiner* — Faiyazkhan Ghafoerkhan
(74) *Attorney, Agent, or Firm* — Hodgson Russ LLP

(57) ABSTRACT

A method for data transmission and a terminal device are provided. The method is applied to a terminal device. The method includes the following. Determine a target bandwidth used for a random access channel (RACH)-based small data transmission (SDT) procedure. Perform the RACH-based SDT procedure with a network device on the target bandwidth, where the SDT procedure is a data transmission procedure in an inactive state of the terminal device.

19 Claims, 12 Drawing Sheets

(56)            References Cited

OTHER PUBLICATIONS

"3rd Generation Partnership Project; Technical Specification Group Radio Access Network; NR; Radio Resource Control (RRC) protocol specification (Release 16)," 3GPP TS 38.331, Sep. 2020, V16.2.0.

LG Electronics Inc., "RACH-based Small Data Transmission," 3GPP TSG-RAN2#112-e, R2-2009457, Nov. 2020.

Samsung, "Rach configuration for Small Data Transmission," 3GPP TSG-RAN2 Meeting #112 Electronic, R2-2009097, Nov. 2020.

WIPO, International Search Report and Written Opinion for International Application No. PCT/CN2021/070666, Sep. 27, 2021.

* cited by examiner

METHOD FOR DATA TRANSMISSION AND TERMINAL DEVICE

CROSS-REFERENCE TO RELATED APPLICATION(S)

This application is a continuation of International Application No. PCT/CN2021/070666, filed Jan. 7, 2021, the entire disclosure of which is incorporated herein by reference.

TECHNICAL FIELD

This disclosure relates to the field of wireless communication, and particularly to a method for data transmission and a terminal device.

BACKGROUND

A radio resource control (RRC)_INACTIVE state (namely, an inactive state) is a new RRC state introduced in a new radio (NR) system from the perspective of power saving.

Small data transmission (SDT) is introduced in release 17 (R17), and an SDT procedure corresponding to the SDT is a data transmission procedure in the inactive state. By means of the SDT procedure, a terminal device does not have to enter an RRC_CONNECTED state (namely, a connected state), and can complete data transmission in the inactive state, which can reduce power consumption and overhead of the terminal device.

Regarding how to configure a bandwidth for performing an SDT procedure, no solution has yet been proposed in the related art.

SUMMARY

Implementations of the disclosure provide a method for data transmission and a terminal device. The terminal device can perform a random access channel (RACH)-based small data transmission (SDT) procedure on a target bandwidth determined. The technical solutions are as follows.

According to an aspect of the disclosure, a method for data transmission is provided. The method is applied to a terminal device. The method includes the following. Determine a target bandwidth used for a RACH-based SDT procedure. Perform the RACH-based SDT procedure with a network device on the target bandwidth, where the SDT procedure is a data transmission procedure in an inactive state of the terminal device.

According to an aspect of the disclosure, a method for data transmission is provided. The method is applied to a network device. The method includes the following. Perform a RACH-based SDT procedure with a terminal device on a target bandwidth, where the SDT procedure is a data transmission procedure in an inactive state of the terminal device.

According to an aspect of the disclosure, a terminal device is provided. The terminal device includes a processor and a transceiver coupled with the processor. The processor is configured to determine a target bandwidth used for a RACH-based SDT procedure. The transceiver is configured to perform the RACH-based SDT procedure with a network device on the target bandwidth, where the SDT procedure is a data transmission procedure in an inactive state of the terminal device.

BRIEF DESCRIPTION OF THE DRAWINGS

In order to describe more clearly technical solutions of implementations of the disclosure, the following will give a brief introduction to the accompanying drawings used for describing the implementations. Apparently, the accompanying drawings described below are merely some implementations of the disclosure. Based on these drawings, those of ordinary skill in the art can also obtain other drawings without creative effort.

DETAILED DESCRIPTION

In order to make purposes, technical solutions, and advantages of the disclosure clearer, the following will further elaborate implementations of the disclosure with reference to the accompanying drawings.

Firstly, a brief introduction will be given to terms involved in implementations of the disclosure.

Radio Resource Control (RRC) State

In new radio (NR), a new RRC state, namely an RRC_INACTIVE state, has been defined in order to reduce air interface signaling, recover radio connections quickly, and recover data services quickly.

RRC_INACTIVE state (i.e., inactive state): Mobility is based on cell selection and re-selection of a terminal device. There is a connection between a core network (CN) and NR. A user equipment (UE) access context exists in a network device. Paging is triggered by a radio access network (RAN), a RAN-based paging area is managed by the RAN, and the network device knows that a location of the terminal device is based on a RAN-based paging area level.

Bandwidth Part (BWP)

Figure 1:
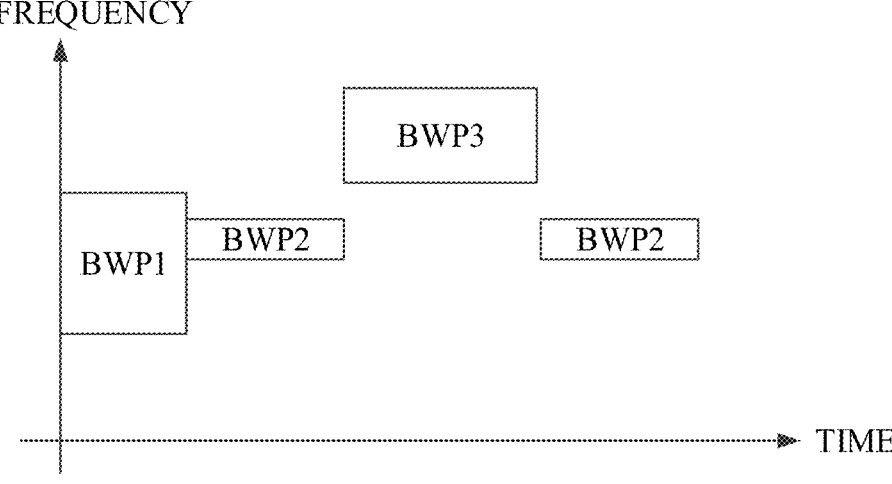
FIG. 1 is a schematic diagram illustrating bandwidth parts (BWP) provided in the related art.

BWP is a concept introduced in NR. BWP is defined as an access bandwidth smaller than each of a system bandwidth of a cell and a terminal capability, and all reception and transmission operations of the terminal device can be performed on the small bandwidth, thereby realizing a terminal operation with higher flexibility, higher efficiency, and lower power consumption. Exemplarily, as illustrated in FIG. 1, the terminal device can flexibly select among BWPs with different bandwidths according to service requirements.

In a downlink (DL) direction, the terminal device is configured with up to four DL BWPs, and only one DL BWP can be activated at one time, where the terminal device can receive a DL channel on the activated DL BWP. In an uplink (UL) direction, the terminal device is configured with up to four UL BWPs, and only one UL BWP can be activated at one time, where the terminal device can receive an UL channel on the activated UL BWP. If the terminal device is configured with a supplementary uplink (SUL) carrier, the terminal device can be additionally configured with four UL BWPs, and only one UL BWP can be activated at one time, where the terminal device can receive an UL channel on the activated UL BWP.

With regard to a DL BWP, each DL BWP at least has one control resource set (CORESET), where the CORESET is used for physical downlink control channel (PDCCH) reception and detection, i.e., the CORESET is a time-frequency range for the terminal device to search for a PDCCH.

In a DL BWP, a CORESET can occupy consecutive or nonconsecutive frequency-domain resources. The network device can indicate, via a bitmap in RRC signaling, a physical resource block (PRB) occupied by the CORESET in the DL BWP, where each bit in the bitmap indicates a resource block (RB) group containing six RBs.

In addition, a duration parameter in a CORESET configuration is used for indicating a time-domain length of the CORESET. Since the CORESET itself does not have time location information, the CORESET defines a time-domain region which is not fixed and can float in time location and is determined by the duration parameter. Therefore, the network device needs to configure a search space to further indicate a time-domain region in which the terminal device can receive a PDCCH.

The UL BWP and the DL BWP above are terminal-dedicated BWPs (namely, UE-dedicated BWPs) configured by using dedicated RRC signaling. In addition, the terminal device is further configured with an initial UL BWP and an initial DL BWP. Before entering the connected state, the terminal device operates on the initial UL BWP or the initial DL BWP.

An initial UL BWP is configured in a system information block 1 (SIB1), and on the initial UL BWP, the terminal device completes transmission of a preamble, a message 3 (Msg3), or a message A (MsgA) during an initial random access procedure.

The initial DL BWP has a CORESET #0, where the CORESET #0 is used for scheduling an SIB1, other system information (OSI), or physical downlink shared channel (PDSCH) information in an initial random access procedure such as message 2 (Msg2) or message 4 (Msg4). A method for the terminal device to determine a CORESET #0 in an initial DL BWP is as follows. After cell search is completed, the terminal device obtains a synchronization signal block (SSB) from a network-device side, determines a frequency-domain location of the SSB, then determines, based on a physical broadcast channel (PBCH) in the SSB, a frequency offset value of a CORESET #0 relative to the SSB, and thus determines the CORESET #0 based on the frequency location of the SSB and the frequency offset value of the CORESET #0 relative to the SSB.

Two ways for determining the initial DL BWP are supported in the standard. In a first way, if the initial DL BWP is not configured by higher-layer signaling, the terminal device takes a frequency domain range of the CORESET #0 as a bandwidth of the initial DL BWP. In a second way, if the initial DL BWP is configured by higher-layer signaling (for example, SIB1), the initial DL BWP is determined according to a configuration of the higher-layer signaling. By separately configuring the initial DL BWP, operations such as serving-cell addition and cell handover can be better supported, and on the other hand, a large bandwidth operation of the terminal device can be supported.

Figure 2:
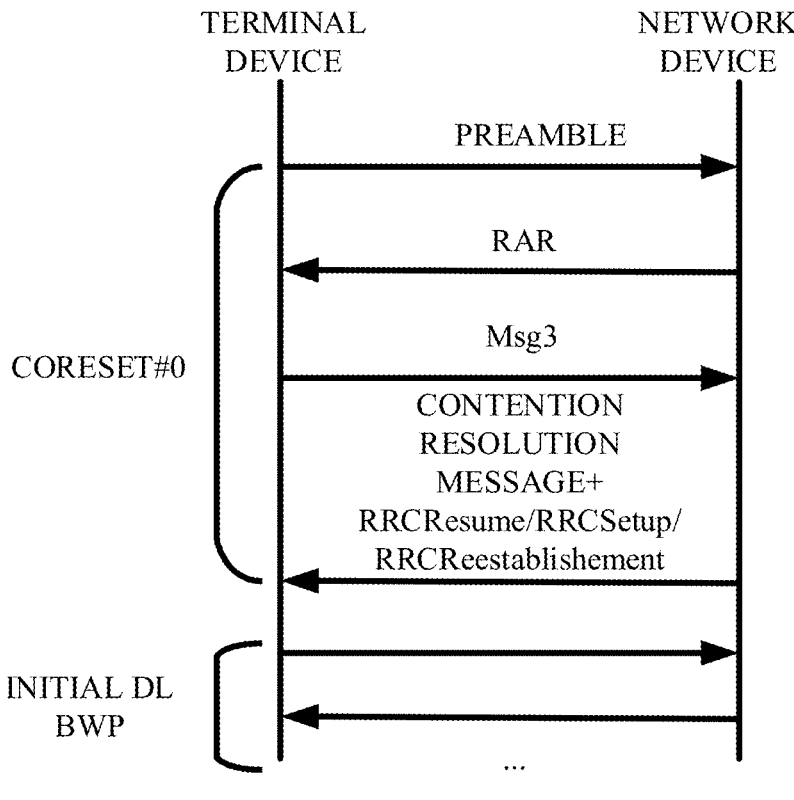
FIG. 2 is a schematic diagram illustrating a random access procedure provided in the related art.

As illustrated in FIG. 2, for the case where an initial DL BWP is separately configured, in a random access procedure, the terminal device receives, on a CORESET #0, a DL message transmitted by the network device, such as a random access response (RAR), a contention resolution message, and an RRC setup message (namely, RRCSetup) or an RRC release message (namely, RRCRelease) or an RRC reestablishment message (namely, RRCReestablishment). After the RRCSetup or the RRCRelease or the RRCReestablishment is received, the terminal device operates on the initial DL BWP.

Small Data Transmission (SDT)

SDT is a data transmission mode configured for the terminal device in the inactive state. By means of an SDT procedure, the terminal device can complete data transmission without entering the connected state, thereby reducing power consumption and overhead of the terminal device.

Optionally, the SDT procedure includes a configured grant (CG)-based SDT procedure and a random access channel (RACH)-based SDT procedure.

Regarding how to configure a bandwidth for executing an SDT procedure, the following solutions are provided in the disclosure.

Figure 3:
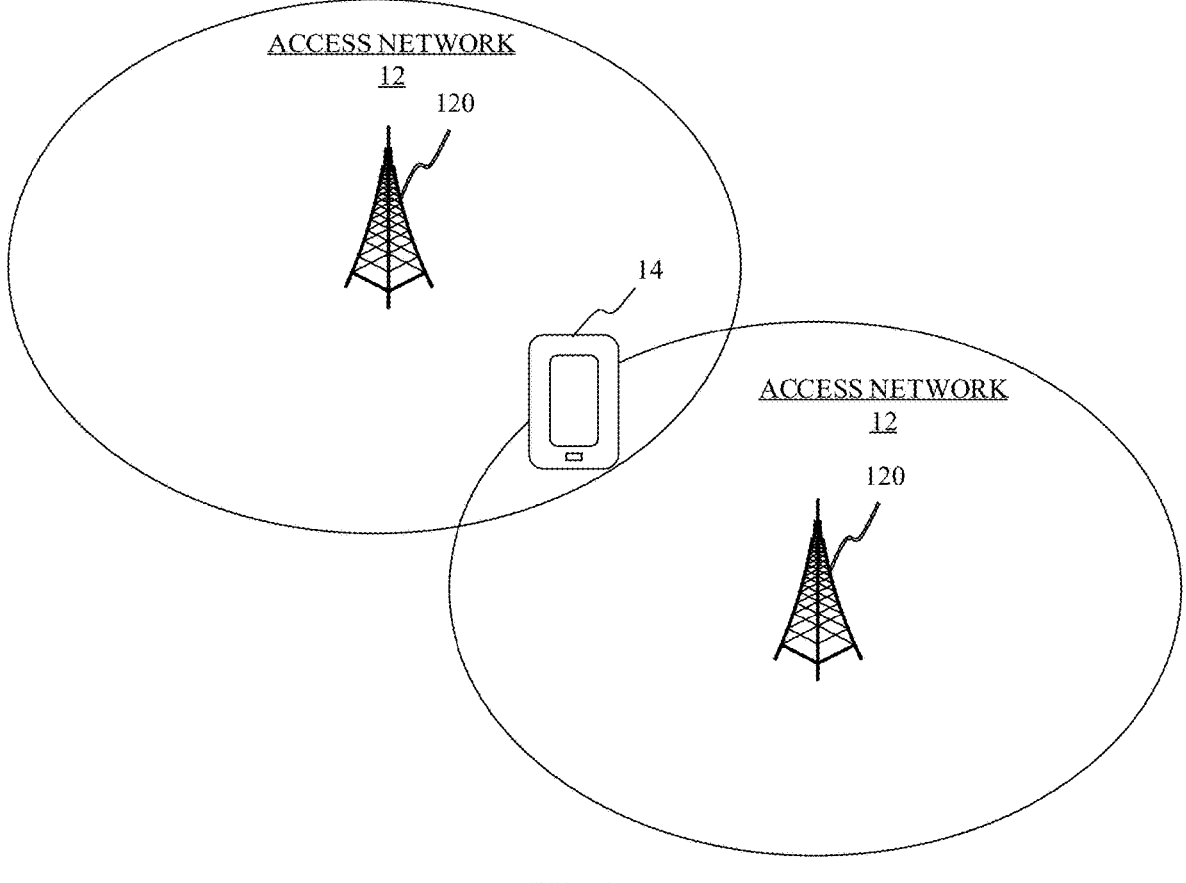
FIG. 3 is a block diagram of a communication system provided in an exemplary implementation of the disclosure.

FIG. 3 is a block diagram of a communication system provided in an exemplary implementation of the disclosure. The communication system may include an access network 12 and a terminal device 14.

The access network 12 includes multiple network devices 120. The network device 120 can be a base station. The base station is an apparatus that is deployed in the access network and used to provide wireless communication functions for the terminal. The base station can include various forms of macro base stations, micro base stations, relay stations, access points, etc. In systems using different radio access technologies, a device with functions of the base station may be in different names. For example, in a long-term evolution (LTE) system, the base station is called eNodeB or eNB. In a $5^{th}$ generation (5G) NR-based access to unlicensed spectrum (NR-U) system, the base station is called gNodeB or gNB. With evolution of communication technology, the term "base station" may change. For the convenience of illustration of implementations of the disclosure, the devices that can provide wireless communication functions for the terminal device 14 are collectively referred to as "network device".

The terminal device 14 can include various devices with wireless communication functions such as handheld devices, in-vehicle devices, wearable devices, computing devices, or other processing devices connected to a wireless modem, as well as various forms of UEs, mobile stations (MS), terminal devices, etc. For the convenience of illustration, the above devices are collectively referred to as "terminal". The network device 120 and the terminal device 14 can communicate with each other with aid of an air-interface technology, such as a UE-universal mobile telecommunication system (UMTS) terrestrial radio access network (UE-UTRAN, Uu) interface. Optionally, the terminal device 14 supports an SDT procedure in the inactive state.

Technical solutions of implementations of the disclosure are applicable to various communication systems, for example, a global system of mobile communication (GSM), a code division multiple access (CDMA) system, a wideband code division multiple access (WCDMA) system, a general packet radio service (GPRS), an LTE system, an LTE frequency division duplex (FDD) system, an LTE time division duplex (TDD) system, an advanced LTE (LTE-A) system, an NR system, an evolved system of an NR system, an LTE-based access to unlicensed spectrum (LTE-U) system, an NR-U system, a universal mobile telecommunication system (UMTS), a worldwide interoperability for microwave access (WiMAX) communication system, a wireless local area network (WLAN), a wireless fidelity (WiFi), a next-generation communication system, or other communication systems.

Generally speaking, a conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) system, etc. Implementations of the disclosure can also be applied to these communication systems.

Figure 4:
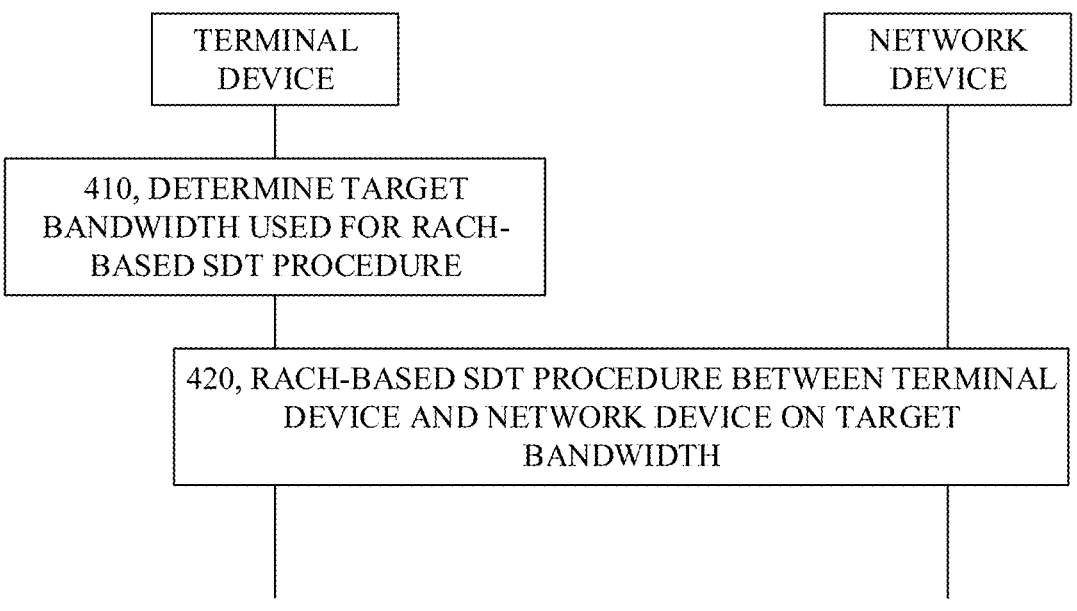
FIG. 4 is a flowchart of a method for data transmission provided in an exemplary implementation of the disclosure.

FIG. 4 is a flowchart of a method for data transmission provided in an exemplary implementation of the disclosure. The method can be applied to the communication system illustrated in FIG. 3. The method includes the following.

Step 410, a terminal device determines a target bandwidth used for a RACH-based SDT procedure.

Before performing the RACH-based SDT procedure, the terminal device determines the target bandwidth used for the RACH-based SDT procedure. Optionally, the target bandwidth includes a target bandwidth used for UL and a target bandwidth used for DL.

Optionally, by receiving higher-layer signaling, such as SIB1, transmitted by a network device, the terminal device can determine, according to a configuration of the higher-layer signaling, the target bandwidth used for the RACH-based SDT procedure.

The SDT procedure is a data transmission procedure in an inactive state of the terminal device.

SDT is a data transmission mode configured for the terminal device in the inactive state, and there is no need for RRC connection establishment between the terminal device and the network device. For a terminal device with low data volume and low transmission frequency, if data transmission is performed only after an RRC connection with the network device is resumed through a connection resume procedure, the terminal device needs to return to the inactive state after data transmission is completed, and as a result, power consumption of the terminal device will be high. By performing an SDT procedure in the inactive state, the terminal device can be exempt from RRC state transition, thereby reducing power consumption of the terminal device.

Optionally, the SDT procedure includes a CG-based SDT procedure and a RACH-based SDT procedure. In implementations of the disclosure, the RACH-based SDT procedure is taken as an example. The RACH-based SDT procedure may be a 2-step RACH-based SDT procedure, or may be a 4-step RACH-based SDT procedure, and implementations of the disclosure are not limited in this regard.

Step 420, the terminal device performs the RACH-based SDT procedure with the network device on the target bandwidth.

After determining the target bandwidth, the terminal device perform the RACH-based SDT procedure with the network device on the target bandwidth.

Optionally, the target bandwidth includes a target bandwidth used for UL and a target bandwidth used for DL. The terminal device performs UL transmission on the target bandwidth used for UL, and the network device performs UL reception on the target bandwidth used for UL. The terminal device performs DL reception on the target bandwidth used for DL, and the network device performs DL transmission on the target bandwidth used for DL.

As can be seen, according to the method provided in implementations of the disclosure, the terminal device firstly determines the target bandwidth before performing the RACH-based SDT procedure, and then performs the RACH-based SDT procedure on the target bandwidth, which provides a way for determining a bandwidth used for performing an SDT procedure.

In the optional implementation based on FIG. 4, there are two different schemes with regard to the target bandwidth.

1) The target bandwidth includes an initial UL BWP and an initial DL BWP.

The initial UL BWP and the initial DL BWP are operation bandwidths determined by the terminal device during an initial access procedure.

In other words, the terminal device determines the initial UL BWP and the initial DL BWP during the initial access procedure, and performs the RACH-based SDT procedure with the network device on the initial UL BWP and the initial DL BWP.

2) The target bandwidth includes a first UL BWP and a first DL BWP.

The first UL BWP and the first DL BWP are BWPs configured for the terminal device and dedicated for the RACH-based SDT procedure.

In other words, the first UL BWP and the first DL BWP are introduced for the RACH-based SDT procedure, and the terminal device performs the RACH-based SDT procedure with the network device on the first UL BWP and the first DL BWP that are newly introduced.

The above two different schemes with regard to the target bandwidth will be respectively exemplified below.

1) The target bandwidth includes the initial UL BWP and the initial DL BWP.

Figure 5:
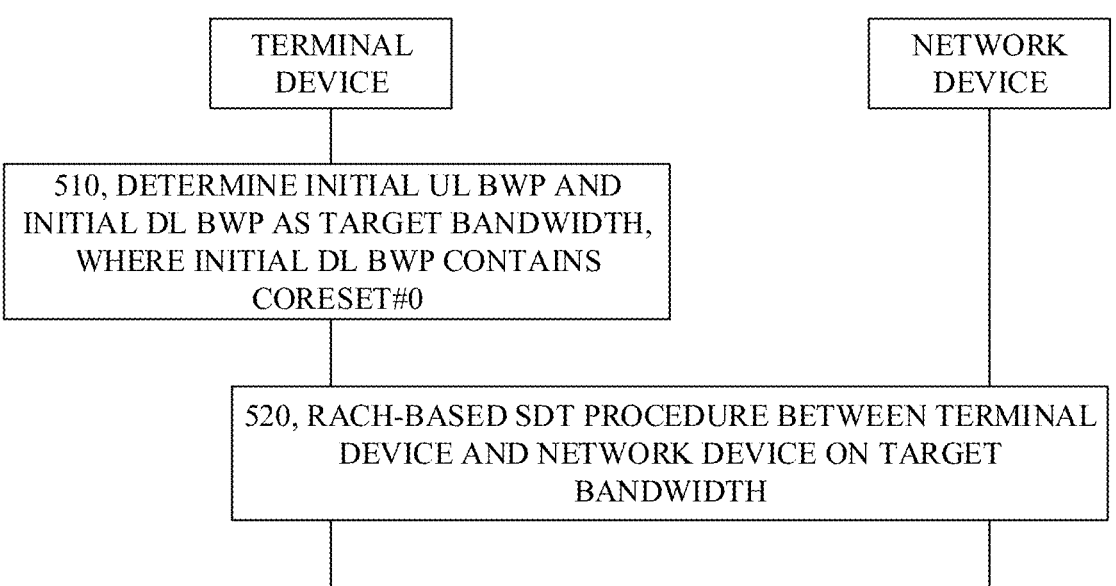
FIG. 5 is a flowchart of a method for data transmission provided in an exemplary implementation of the disclosure.

Based on the optional implementation illustrated in FIG. 4, refer to FIG. 5, which is a flowchart of a method for data transmission provided in an exemplary implementation of the disclosure. The method can be applied to the communication system illustrated in FIG. 3. The method includes the following.

Step 510, the terminal device determines the initial UL BWP and the initial DL BWP as the target bandwidth, where the initial DL BWP has a CORESET #0.

Figure 6:
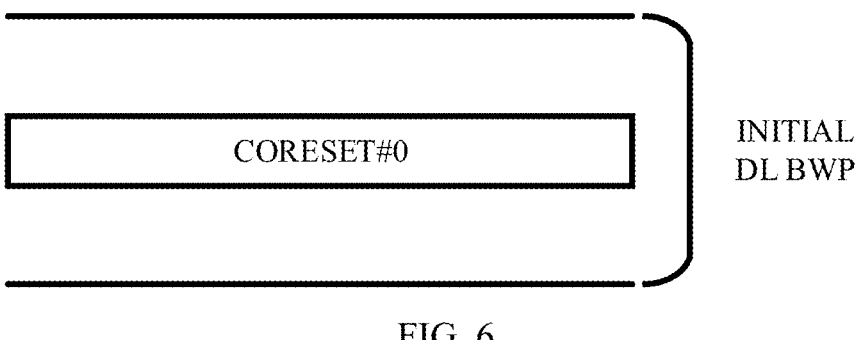
FIG. 6 is a schematic diagram illustrating an initial downlink (DL) BWP provided in an exemplary implementation of the disclosure.

The initial UL BWP and the initial DL BWP are operation bandwidths determined by the terminal device during an initial access procedure. The CORESET #0 is a control resource set used for carrying scheduling information of SIB1 (where SIB1 is also referred to as remaining minimum system information (RMSI)). As illustrated in FIG. 6, the initial DL BWP has the CORESET #0.

Optionally, the initial UL BWP and the initial DL BWP are determined based on an SIB1 scheduled by the CORE-SET #0. That is, after determining the CORESET #0, the terminal device receives the SIB1 scheduled by the CORE-SET #0, and determines the initial UL BWP and the initial DL BWP based on the SIB1.

Optionally, the terminal device determines the CORESET #0 as follows. After cell search is completed, the terminal device obtains an SSB from a network-device side, determines a frequency-domain location of the SSB, then determines, based on a PBCH in the SSB, a frequency offset value of the CORESET #0 relative to the SSB, and thus determines the CORESET #0 based on the frequency location of the SSB and the frequency offset value of the CORESET #0 relative to the SSB.

Step 520, the terminal device performs the RACH-based SDT procedure with the network device on the target bandwidth.

Optionally, the RACH-based SDT procedure includes a 4-step RACH-based SDT procedure and a 2-step RACH-based SDT procedure.

I. The terminal device performs a 4-step RACH-based SDT procedure with the network device on the target bandwidth.

Optionally, the terminal device transmits to the network device on the initial UL BWP at least one of a preamble, a Msg3, a Msg3 retransmission, or an UL transmission dynamically scheduled by the network device. Accordingly, the network device receives, on the initial UL BWP, at least one of the preamble, the Msg3, the Msg3 retransmission, or the UL transmission dynamically scheduled by the network device transmitted by the terminal device.

Optionally, the terminal device receives, on the CORE-SET #0 in the initial DL BWP, at least one of an RAR, a Msg3 retransmission indication, or a Msg4. Accordingly, the network device transmits to the terminal device on the CORESET #0 in the initial DL BWP at least one of the RAR, the Msg3 retransmission indication, or the Msg4.

It can be understood that, after transmission of the Msg4 is completed, the terminal device stays in the inactive state, and the terminal device and the network device can perform continuous UL transmission or DL transmission. In order to receive an UL scheduling or a DL scheduling required for the continuous UL transmission or DL transmission, the bandwidth can be switched from the CORESET #0 to a larger bandwidth.

In a possible implementation, if the Msg4 includes a contention resolution message and does not include an RRC release message, the terminal device receives a resource scheduling on the initial DL BWP, where the resource scheduling includes at least one of an UL scheduling or a DL scheduling. Accordingly, if the Msg4 includes the contention resolution message and does not include the RRC release message, the network device transmits the resource scheduling on the initial DL BWP, where the resource scheduling includes at least one of the UL scheduling or the DL scheduling.

That is, if the Msg4 indicates that contention resolution has been completed and does not indicate termination of the SDT procedure, the terminal device switches from the CORESET #0 to the initial DL BWP with a larger bandwidth, so as to receive a subsequent resource scheduling.

In another possible implementation, the initial DL BWP further has a first CORESET and/or a first search space, where the first CORESET is a CORESET configured for the terminal device in the initial DL BWP, and the first search space is a search space configured for the terminal device in the initial DL BWP.

If the Msg4 includes a contention resolution message and does not include an RRC release message, the terminal device receives a resource scheduling on the first CORESET and/or the first search space, where the resource scheduling includes at least one of an UL scheduling or a DL scheduling. Accordingly, if the Msg4 includes the contention resolution message and does not include the RRC release message, the network device transmits the resource scheduling on the first CORESET and/or the first search space, where the resource scheduling includes at least one of the UL scheduling or the DL scheduling.

In other words, the network device configures for the terminal device the first CORESET dedicated for the SDT procedure, or the network device configures for the terminal device the first search space dedicated for the SDT procedure, or the network device configures for the terminal device the first CORESET and the first search space dedicated for the SDT procedure. If the Msg4 indicates that contention resolution has been completed and does not indicate termination of the SDT procedure, the terminal device switches from the CORESET #0 to the first CORE-SET and/or the first search space with a larger bandwidth, so as to receive a subsequent resource scheduling.

Optionally, the first CORESET and/or the first search space is determined based on the SIB1 scheduled by the CORESET #0. In other words, after determining the CORE-SET #0, the terminal device receives the SIB1 scheduled by the CORESET #0, and determines the first CORESET, or the first search space, or both the first CORESET and the first search space according to the SIB1 in addition to determining the initial UL BWP and the initial DL BWP according to the SIB1.

Optionally, the UL scheduling and the DL scheduling belong to the same RACH-based SDT procedure.

Figure 7:
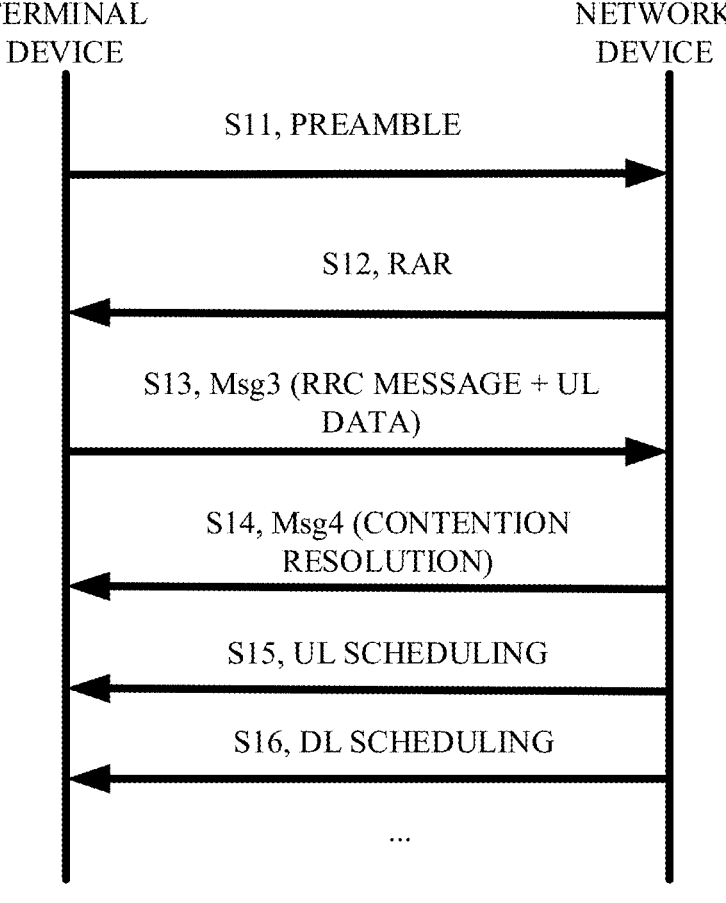
FIG. 7 is a schematic diagram illustrating a random access channel (RACH)-based small data transmission (SDT) procedure provided in an exemplary implementation of the disclosure.

Exemplarily, as illustrated in FIG. 7, the 4-step RACH-based SDT procedure between the terminal device and the network device includes the following.

S11, the terminal device transmits a preamble on the initial UL BWP.

Accordingly, the network device receives the preamble on the initial UL BWP.

S12, the network device transmits an RAR on the CORE-SET #0.

Accordingly, the terminal device receives the RAR on the CORESET #0.

S13, the terminal device transmits a Msg3 on the initial UL BWP.

Accordingly, the network device receives the Msg3 on the initial UL BWP.

Optionally, the Msg3 includes an RRC message and UL data.

S14, the network device transmits a Msg4 on the CORE-SET #0.

Accordingly, the terminal device receives the Msg4 on the CORESET #0.

Optionally, the Msg4 includes a contention resolution message, but does not include an RRC release message.

S15, the network device transmits an UL scheduling on the initial DL BWP.

Accordingly, the terminal device receives the UL scheduling on the initial DL BWP.

In another implementation, the network device transmits the UL scheduling on the first CORESET and/or the first search space. Accordingly, the terminal device receives the UL scheduling on the first CORESET and/or the first search space.

S16, the network device transmits a DL scheduling on the initial DL BWP.

Accordingly, the terminal device receives the DL scheduling on the initial DL BWP.

In another implementation, the network device transmits the DL scheduling on the first CORESET and/or the first search space. Accordingly, the terminal device receives the DL scheduling on the first CORESET and/or the first search space.

II. The terminal device performs a 2-step RACH-based SDT procedure with the network device on the target bandwidth.

Optionally, the terminal device transmits to the network device on the initial UL BWP at least one of a preamble, a MsgA payload, a Msg3, a Msg3 retransmission, or an UL transmission dynamically scheduled by the network device. Accordingly, the network device receives, on the initial UL BWP, at least one of the preamble, the MsgA payload, the Msg3, the Msg3 retransmission, or the UL transmission dynamically scheduled by the network device transmitted by the terminal device.

Optionally, the terminal device receives, on the CORESET #0 in the initial DL BWP, at least one of an RAR, a Msg3 retransmission indication, a Msg4, or a message B (MsgB) transmitted by the network device. Accordingly, the network device transmits to the terminal device on the CORESET #0 in the initial DL BWP at least one of the RAR, the Msg3 retransmission indication, the Msg4, or the MsgB.

It can be understood that, in a 2-step RACH, if the network device only receives the preamble transmitted by the terminal device but failed to receive the MsgA payload, the network device will transmit the RAR to the terminal device. After receiving the RAR, the terminal device transmits the Msg3 to the network device. If the network device successfully receives the Msg3, the network device will feed back the Msg4 to the terminal device. If the network device successfully receives the preamble and the MsgA payload transmitted by the terminal device, the network device will feed back the MsgB to the terminal device. After transmission of the Msg4 or the MsgB is completed, the terminal device stays in the inactive state, and the terminal device and the network device can perform continuous UL transmission or DL transmission. In order to receive an UL scheduling or a DL scheduling required for the continuous UL transmission or DL transmission, the bandwidth can be switched from the CORESET #0 to a larger bandwidth.

In a possible implementation, if the MsgB includes a contention resolution message and does not include an RRC release message, the terminal device receives a resource scheduling on the initial DL BWP, where the resource scheduling includes at least one of an UL scheduling or a DL scheduling. Alternatively, if the Msg4 includes a contention resolution message and does not include an RRC release message, the terminal device receives a resource scheduling on the initial DL BWP, where the resource scheduling includes at least one of an UL scheduling or a DL scheduling. Accordingly, if the MsgB includes the contention resolution message and does not include the RRC release message, the network device transmits the resource scheduling on the initial DL BWP, where the resource scheduling includes at least one of the UL scheduling or the DL scheduling. Alternatively, if the Msg4 includes the contention resolution message and does not include the RRC release message, the network device transmits the resource scheduling on the initial DL BWP, where the resource scheduling includes at least one of the UL scheduling or the DL scheduling.

That is, if the Msg4 or the MsgB indicates that contention resolution has been completed and does not indicate termination of the SDT procedure, the terminal device switches from the CORESET #0 to the initial DL BWP with a larger bandwidth, so as to receive a subsequent resource scheduling.

In another possible implementation, the initial DL BWP further has a first CORESET and/or a first search space, where the first CORESET is a CORESET configured for the terminal device in the initial DL BWP, and the first search space is a search space configured for the terminal device in the initial DL BWP.

If the MsgB includes a contention resolution message and does not include an RRC release message, the terminal device receives a resource scheduling on the first CORESET and/or the first search space, where the resource scheduling includes at least one of an UL scheduling or a DL scheduling. Alternatively, if the Msg4 includes a contention resolution message and does not include an RRC release message, the terminal device receives a resource scheduling on the first CORESET and/or the first search space, where the resource scheduling includes at least one of an UL scheduling or a DL scheduling. Accordingly, if the MsgB includes the contention resolution message and does not include the RRC release message, the network device transmits the resource scheduling on the first CORESET and/or the first search space, where the resource scheduling includes at least one of the UL scheduling or the DL scheduling. Alternatively, if the Msg4 includes the contention resolution message and does not include the RRC release message, the network device transmits the resource scheduling on the first CORESET and/or the first search space, where the resource scheduling includes at least one of the UL scheduling or the DL scheduling.

In other words, the network device configures for the terminal device the first CORESET dedicated for the SDT procedure, or the network device configures for the terminal device the first search space dedicated for the SDT procedure, or the network device configures for the terminal device the first CORESET and the first search space dedicated for the SDT procedure. If the Msg4 or the MsgB indicates that contention resolution has been completed and does not indicate termination of the SDT procedure, the terminal device switches from the CORESET #0 to the first CORESET and/or the first search space with a larger bandwidth, so as to receive a subsequent resource scheduling.

Optionally, the first CORESET and/or the first search space is determined based on the SIB1 scheduled by the CORESET #0. In other words, after determining the CORESET #0, the terminal device receives the SIB1 scheduled by the CORESET #0, and determines the first CORESET, or the first search space, or both the first CORESET and the first search space according to the SIB1 in addition to determining the initial UL BWP and the initial DL BWP according to the SIB1.

Optionally, the UL scheduling and the DL scheduling belong to the same RACH-based SDT procedure.

Figure 8:
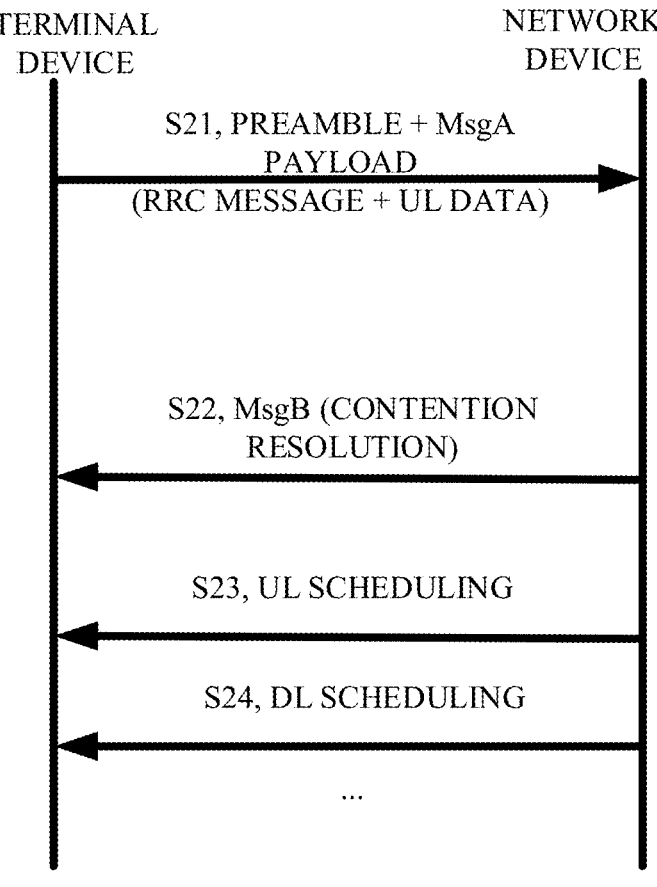
FIG. 8 is a schematic diagram illustrating a RACH-based SDT procedure provided in an exemplary implementation of the disclosure.

Exemplarily, as illustrated in FIG. 8, a 2-step RACH-based SDT procedure between the terminal device and the network device includes the following.

S21, the terminal device transmits a preamble and a MsgA payload on the initial UL BWP.

Accordingly, the network device receives the preamble and the MsgA payload on the initial UL BWP.

Optionally, the MsgA payload includes an RRC message and UL data.

S22, the network device transmits a MsgB on the CORESET #0.

Accordingly, the terminal device receives the MsgB on the CORESET #0.

Optionally, the MsgB includes a contention resolution message and does not include an RRC release message.

S23, the network device transmits an UL scheduling on the initial DL BWP.

Accordingly, the terminal device receives the UL scheduling on the initial DL BWP.

In another implementation, the network device transmits the UL scheduling on the first CORESET and/or the first search space. Accordingly, the terminal device receives the UL scheduling on the first CORESET and/or the first search space.

S24, the network device transmits a DL scheduling on the initial DL BWP.

Accordingly, the terminal device receives the DL scheduling on the initial DL BWP.

In another implementation, the network device transmits the DL scheduling on the first CORESET and/or the first search space. Accordingly, the terminal device receives the DL scheduling on the first CORESET and/or the first search space.

Figure 9:
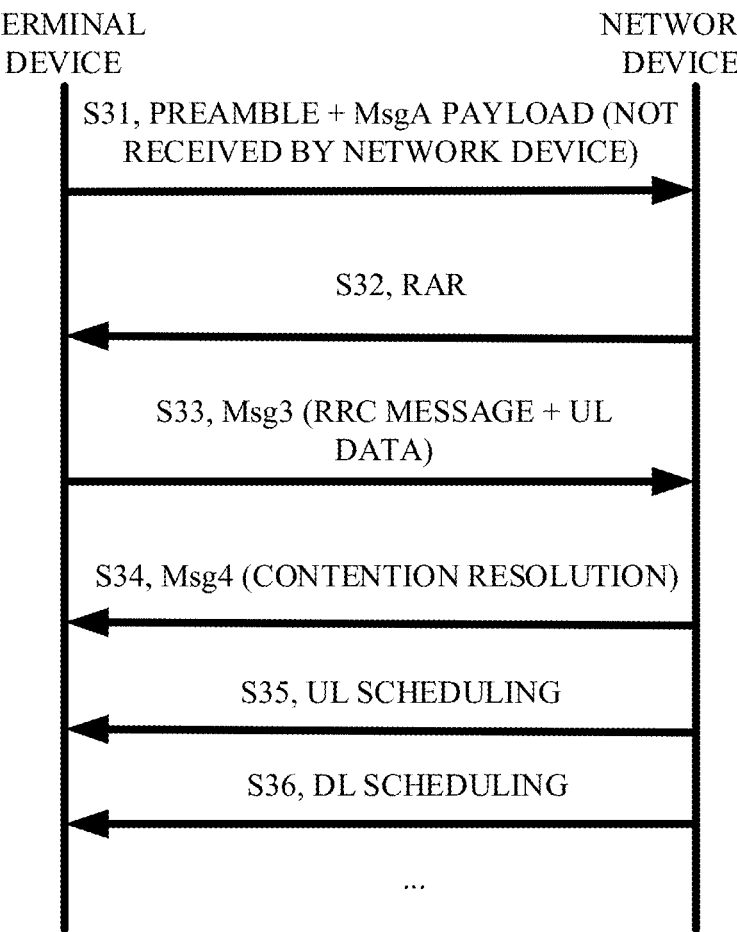
FIG. 9 is a schematic diagram illustrating a RACH-based SDT procedure provided in an exemplary implementation of the disclosure.

Exemplarily, as illustrated in FIG. 9, a 2-step RACH-based SDT procedure between the terminal device and the network device includes the following.

S31, the terminal device transmits a preamble and a MsgA payload on the initial UL BWP.

Accordingly, the network device only receives the preamble on the initial UL BWP, but failed to receive the MsgA payload.

S32, the network device transmits an RAR on the CORESET #0.

Accordingly, the terminal device receives the RAR on the CORESET #0.

S33, the terminal device transmits a Msg3 on the initial UL BWP.

Accordingly, the network device receives the Msg3 on the initial UL BWP.

Optionally, the Msg3 includes an RRC message and UL data.

S34, the network device transmits a Msg4 on the CORESET #0.

Accordingly, the terminal device receives the Msg4 on the CORESET #0.

Optionally, the Msg4 includes a contention resolution message and does not include an RRC release message.

S35, the network device transmits an UL scheduling on the initial DL BWP.

Accordingly, the terminal device receives the UL scheduling on the initial DL BWP.

In another implementation, the network device transmits the UL scheduling on the first CORESET and/or the first search space. Accordingly, the terminal device receives the UL scheduling on the first CORESET and/or the first search space.

S36, the network device transmits a DL scheduling on the initial DL BWP.

Accordingly, the terminal device receives the DL scheduling on the initial DL BWP.

In another implementation, the network device transmits the DL scheduling on the first CORESET and/or the first search space. Accordingly, the terminal device receives the DL scheduling on the first CORESET and/or the first search space.

As can be seen, according to the method provided in the implementation, for a RACH-based SDT procedure, the terminal device can first implement a random access procedure on the initial UL BWP and the CORESET #0 in the initial DL BWP, and then switch from the CORESET #0 to the initial DL BWP with a larger bandwidth or switch from the CORESET #0 to the first CORESET and/or the first search space with a larger bandwidth, which can facilitate subsequent UL and DL scheduling as well as UL and DL transmission, thereby improving data transmission capability in an SDT procedure.

2) The target bandwidth includes the first UL BWP and the first DL BWP.

Figure 10:
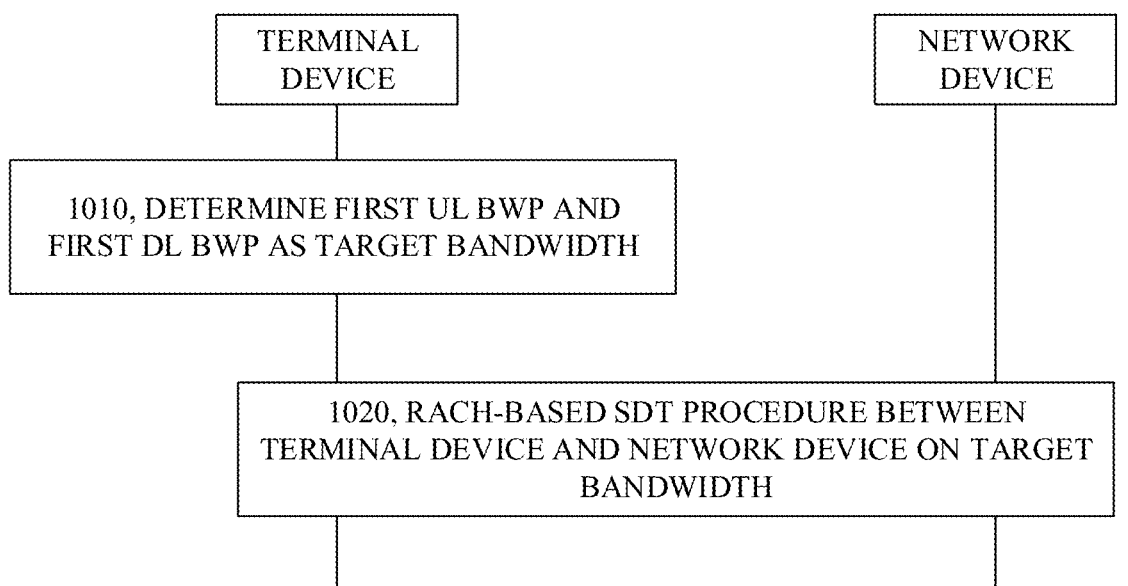
FIG. 10 is a flowchart of a method for data transmission provided in an exemplary implementation of the disclosure.

Based on the optional implementation illustrated in FIG. 4, refer to FIG. 10, which is a flowchart of a method for data transmission provided in an exemplary implementation of the disclosure. The method can be applied to the communication system illustrated in FIG. 3. The method includes the following.

Step 1010, the terminal device determines the first UL BWP and the first DL BWP as the target bandwidth.

The first UL BWP and the first DL BWP are BWPs configured for the terminal device and dedicated for the RACH-based SDT procedure. Optionally, the first DL BWP has a CORESET #0.

Optionally, the first UL BWP and the first DL BWP are determined based on an SIB1 scheduled by the CORESET #0. In other words, after determining the CORESET #0, the terminal device receives the SIB1 scheduled by the CORESET #0, and determines the first UL BWP and the first DL BWP based on the SIB1.

Optionally, the terminal device determines the CORESET #0 as follows. After cell search is completed, the terminal device obtains an SSB from a network-device side, determines a frequency-domain location of the SSB, then determines, based on a PBCH in the SSB, a frequency offset value of the CORESET #0 relative to the SSB, and thus determines the CORESET #0 based on the frequency location of the SSB and the frequency offset value of the CORESET #0 relative to the SSB.

Step 1020, the terminal device performs the RACH-based SDT procedure with the network device on the target bandwidth.

Optionally, the RACH-based SDT procedure includes a 4-step RACH-based SDT procedure and a 2-step RACH-based SDT procedure.

I. The terminal device performs a 4-step RACH-based SDT procedure with the network device on the target bandwidth.

Optionally, the terminal device transmits to the network device on the first UL BWP at least one of a preamble, a Msg3, a Msg3 retransmission, or an UL transmission dynamically scheduled by the network device. Accordingly, the network device receives, on the first UL BWP, at least one of the preamble, the Msg3, the Msg3 retransmission, or the UL transmission dynamically scheduled by the network device transmitted by the terminal device.

Optionally, the terminal device receives, on the first DL BWP, at least one of an RAR, a Msg3 retransmission indication, an UL scheduling, a DL scheduling, or a Msg4 transmitted by the network device. Accordingly, the network device transmits to the terminal device on the first DL BWP at least one of the RAR, the Msg3 retransmission indication, the UL scheduling, the DL scheduling, or the Msg4.

Optionally, the UL scheduling and the DL scheduling belong to the same RACH-based SDT procedure.

Figure 11:
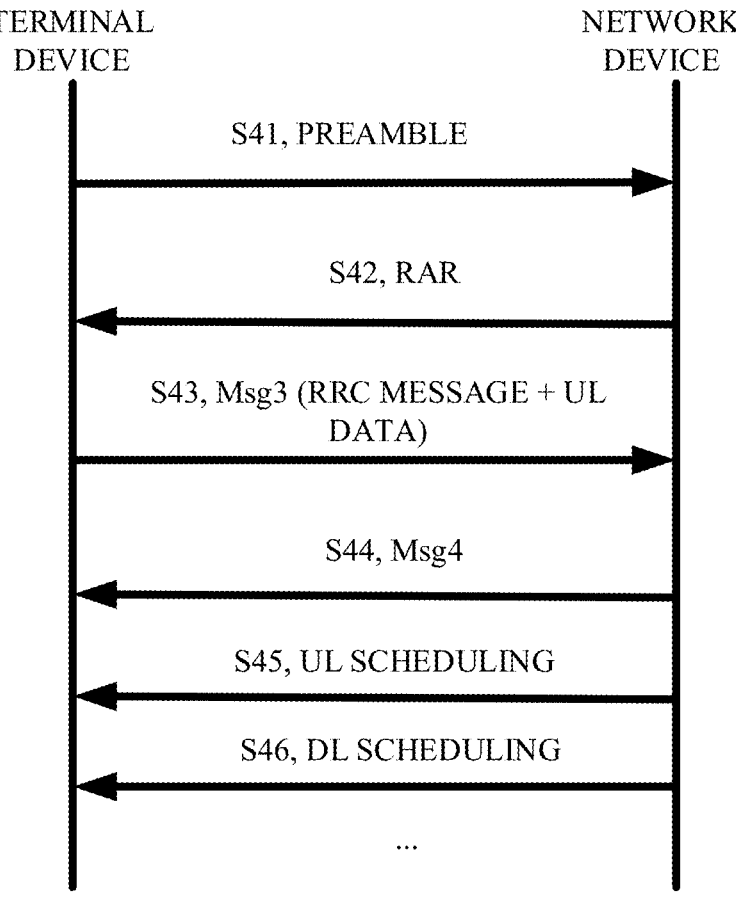
FIG. 11 is a schematic diagram illustrating a RACH-based SDT procedure provided in an exemplary implementation of the disclosure.

Exemplarily, as illustrated in FIG. 11, a 4-step RACH-based SDT procedure between the terminal device and the network device includes the following.

S41, the terminal device transmits a preamble on the first UL BWP.

Accordingly, the network device receives the preamble on the first UL BWP.

S42, the network device transmits an RAR on the first DL BWP.

Accordingly, the terminal device receives the RAR on the first DL BWP.

S43, the terminal device transmits a Msg3 on the first UL BWP.

Accordingly, the network device receives the Msg3 on the first UL BWP.

Optionally, the Msg3 includes an RRC message and UL data.

S44, the network device transmits a Msg4 on the first DL BWP.

Accordingly, the terminal device receives the Msg4 on the first DL BWP.

S45, the network device transmits an UL scheduling on the first DL BWP.

Accordingly, the terminal device receives the UL scheduling on the first DL BWP.

S46, the network device transmits a DL scheduling on the first DL BWP.

Accordingly, the terminal device receives the DL scheduling on the first DL BWP.

II. The terminal device performs a 2-step RACH-based SDT procedure with the network device on the target bandwidth.

Optionally, the terminal device transmits to the network device on the first UL BWP at least one of a preamble, a MsgA payload, a Msg3, a Msg3 retransmission, or an UL transmission dynamically scheduled by the network device. Accordingly, the network device receives, on the first UL BWP, at least one of the preamble, the MsgA payload, the Msg3, the Msg3 retransmission, or the UL transmission dynamically scheduled by the network device transmitted by the terminal device.

Optionally, the terminal device receives, on the first DL BWP, at least one of an RAR, a Msg3 retransmission indication, a Msg4, an UL scheduling, a DL scheduling, or a MsgB transmitted by the network device. Accordingly, the network device transmits to the terminal device on the first DL BWP at least one of the RAR, the Msg3 retransmission indication, the Msg4, the UL scheduling, the DL scheduling, or the MsgB.

Optionally, the UL scheduling and the DL scheduling belong to the same RACH-based SDT procedure.

Figure 12:
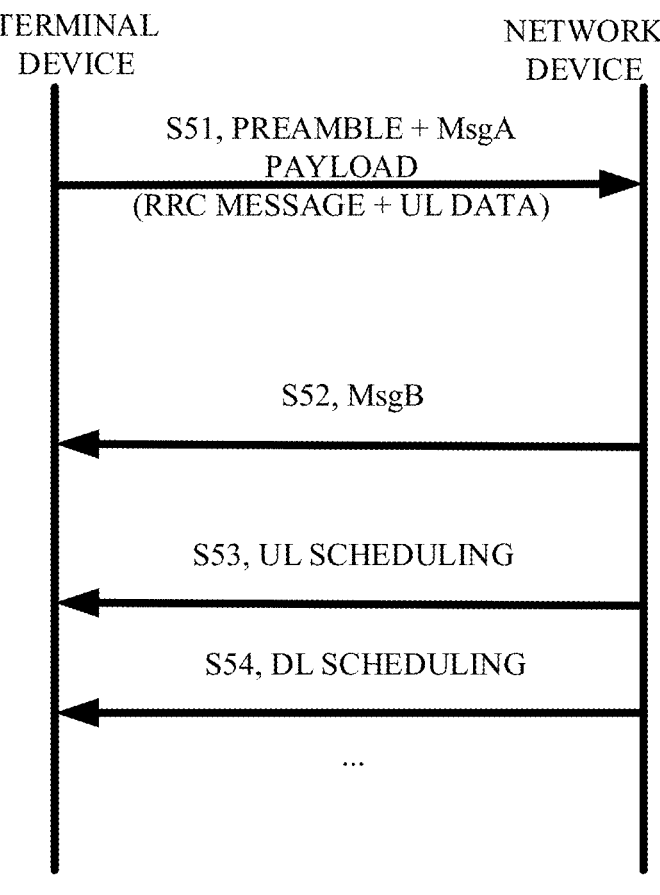
FIG. 12 is a schematic diagram illustrating a RACH-based SDT procedure provided in an exemplary implementation of the disclosure.

Exemplarily, as illustrated in FIG. 12, a 2-step RACH-based SDT procedure between the terminal device and the network device includes the following.

S51, the terminal device transmits a preamble and a MsgA payload on the first UL BWP.

Accordingly, the network device receives the preamble and the MsgA payload on the first UL BWP.

Optionally, the MsgA payload includes an RRC message and UL data.

S52, the network device transmits a MsgB on the first DL BWP.

Accordingly, the terminal device receives the MsgB on the first DL BWP.

S53, the network device transmits an UL scheduling on the first DL BWP.

Accordingly, the terminal device receives the UL scheduling on the first DL BWP.

S54, the network device transmits a DL scheduling on the first DL BWP.

Accordingly, the terminal device receives the DL scheduling on the first DL BWP.

Figure 13:
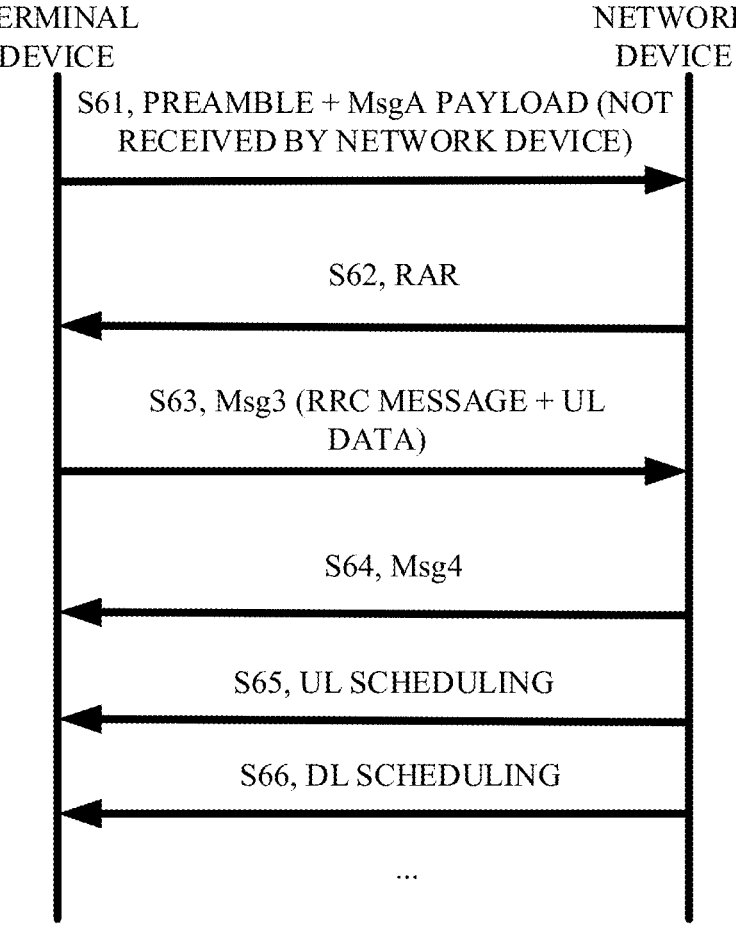
FIG. 13 is a schematic diagram illustrating a RACH-based SDT procedure provided in an exemplary implementation of the disclosure.

Exemplarily, as illustrated in FIG. 13, a 2-step RACH-based SDT procedure between the terminal device and the network device includes the following.

S61, the terminal device transmits a preamble and a MsgA payload on the first UL BWP.

Accordingly, the network device only receives the preamble on the first UL BWP, but failed to receive the MsgA payload.

S62, the network device transmits an RAR on the first DL BWP.

Accordingly, the terminal device receives the RAR on the first DL BWP.

S63, the terminal device transmits a Msg3 on the first UL BWP.

Accordingly, the network device receives the Msg3 on the first UL BWP.

Optionally, the Msg3 includes an RRC message and UL data.

S64, the network device transmits a Msg4 on the first DL BWP.

Accordingly, the terminal device receives the Msg4 on the first DL BWP.

S65, the network device transmits an UL scheduling on the first DL BWP.

Accordingly, the terminal device receives the UL scheduling on the first DL BWP.

S66, the network device transmits a DL scheduling on the first DL BWP.

Accordingly, the terminal device receives the DL scheduling on the first DL BWP.

As can be seen, according to the method provided in the implementation, the first UL BWP and the first DL BWP are dedicatedly configured for a RACH-based SDT procedure, so that the terminal device and the network device can implement the RACH-based SDT procedure on the first UL BWP and the first DL BWP.

It should be noted that, the foregoing method implementations may be implemented separately or in combination, and the disclosure is not limited in this regard.

In each of the foregoing implementations, steps executed by the terminal device may be separately implemented as a method for data transmission at a terminal-device side, and steps executed by the network device may be separately implemented as a method for data transmission at a network-device side.

Figure 14:
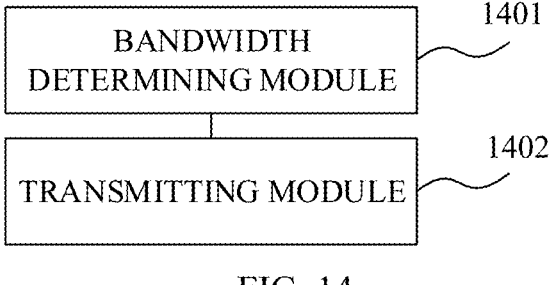
FIG. 14 is a structural block diagram of an apparatus for data transmission provided in an exemplary implementation of the disclosure.

FIG. 14 is a structural block diagram of an apparatus for data transmission provided in an exemplary implementation of the disclosure. The apparatus may be implemented as a terminal device or a part of the terminal device. The apparatus includes a bandwidth determining module 1401 and a transmitting module 1402. The bandwidth determining module 1401 is configured to determine a target bandwidth used for a RACH-based SDT procedure. The transmitting module 1402 is configured to perform the RACH-based SDT procedure with a network device on the target bandwidth, where the SDT procedure is a data transmission procedure in an inactive state of the terminal device.

In an optional implementation, the bandwidth determining module 1401 is configured to determine an initial UL BWP and an initial DL BWP as the target bandwidth, where the initial DL BWP has a CORESET #0.

In an optional implementation, the RACH includes a 4-step RACH, and the transmitting module 1402 is configured to transmit to the network device on the initial UL BWP at least one of a preamble, a Msg3, a Msg3 retransmission, or an UL transmission dynamically scheduled by the network device.

In an optional implementation, the RACH includes a 4-step RACH, and the transmitting module 1402 is configured to receive, on the CORESET #0 in the initial DL BWP, at least one of an RAR, a Msg3 retransmission indication, or a Msg4 transmitted by the network device.

In an optional implementation, the transmitting module 1402 is configured to receive a resource scheduling on the initial DL BWP when the Msg4 includes a contention resolution message and does not include a radio resource control (RRC) release message, where the resource scheduling includes at least one of an UL scheduling or a DL scheduling.

In an optional implementation, the initial DL BWP further has a first CORESET and/or a first search space, where the first CORESET is a CORESET configured for the terminal device in the initial DL BWP, and the first search space is a search space configured for the terminal device in the initial DL BWP. The transmitting module 1402 is configured to receive a resource scheduling on the first CORESET and/or the first search space when the Msg4 includes a contention resolution message and does not include an RRC release message, where the resource scheduling includes at least one of an UL scheduling or a DL scheduling.

In an optional implementation, the RACH includes a 2-step RACH, and the transmitting module 1402 is configured to transmit to the network device on the initial UL BWP at least one of a preamble, a MsgA payload, a Msg3, a Msg3 retransmission, or an UL transmission dynamically scheduled by the network device.

In an optional implementation, the RACH includes a 2-step RACH, and the transmitting module 1402 is configured to receive, on the CORESET #0 in the initial DL BWP, at least one of an RAR, a Msg3 retransmission indication, a Msg4, or a MsgB transmitted by the network device.

In an optional implementation, the transmitting module 1402 is configured to receive a resource scheduling on the initial DL BWP when the MsgB includes a contention resolution message and does not include an RRC release message, where the resource scheduling includes at least one of an UL scheduling or a DL scheduling; or receive a resource scheduling on the initial DL BWP when the Msg4 includes a contention resolution message and does not includes an RRC release message, where the resource scheduling includes at least one of an UL scheduling or a DL scheduling.

In an optional implementation, the initial DL BWP further has a first CORESET and/or a first search space, where the first CORESET is a CORESET configured for the terminal device in the initial DL BWP, and the first search space is a search space configured for the terminal device in the initial DL BWP. The transmitting module 1402 is configured to receive a resource scheduling on the first CORESET and/or the first search space when the MsgB includes a contention resolution message and does not include an RRC release message, where the resource scheduling includes at least one of an UL scheduling or a DL scheduling; or receive a resource scheduling on the first CORESET and/or the first search space when the Msg4 includes a contention resolution message and does not include an RRC release message, where the resource scheduling includes at least one of an UL scheduling or a DL scheduling.

In an optional implementation, the UL scheduling and the DL scheduling belong to the same RACH-based SDT procedure.

In an optional implementation, the first CORESET and/or the first search space is determined based on an SIB1 scheduled by the CORESET #0.

In an optional implementation, the initial UL BWP and the initial DL BWP are determined based on the SIB1 scheduled by the CORESET #0.

In an optional implementation, the bandwidth determining module 1401 is configured to determine a first UL BWP and a first DL BWP as the target bandwidth, where the first UL BWP and the first DL BWP are BWPs configured for the terminal device and dedicated for the RACH-based SDT procedure.

In an optional implementation, the RACH includes a 4-step RACH, and the transmitting module 1402 is configured to transmit to the network device on the first UL BWP at least one of a preamble, a Msg3, a Msg3 retransmission, or an UL transmission dynamically scheduled by the network device.

In an optional implementation, the RACH includes a 4-step RACH, and the transmitting module 1402 is configured to receive, on the first DL BWP, at least one of an RAR, a Msg3 retransmission indication, an UL scheduling, a DL scheduling, or a Msg4 transmitted by the network device.

In an optional implementation, the RACH includes a 2-step RACH, and the transmitting module 1402 is configured to transmit to the network device on the first UL BWP at least one of a preamble, a MsgA payload, a Msg3, a Msg3 retransmission, or an UL transmission dynamically scheduled by the network device.

In an optional implementation, the RACH includes a 2-step RACH, and the transmitting module 1402 is configured to receive, on the first DL BWP, at least one of an RAR, a Msg3 retransmission indication, a Msg4, an UL scheduling, a DL scheduling, or a MsgB transmitted by the network device.

In an optional implementation, the UL scheduling and the DL scheduling belong to the same RACH-based SDT procedure.

In an optional implementation, the first UL BWP and the first DL BWP are determined based on an SIB1 scheduled by a CORESET #0.

Figure 15:
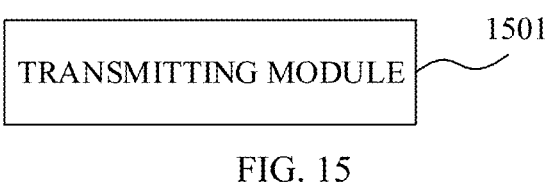
FIG. 15 is a structural block diagram of an apparatus for data transmission provided in an exemplary implementation of the disclosure.

FIG. 15 is a structural block diagram of an apparatus for data transmission provided in an exemplary implementation of the disclosure. The apparatus may be implemented as a network device or a part of the network device. The apparatus includes a transmitting module 1501. The transmitting module 1501 is configured to perform a RACH-based SDT procedure with a terminal device on a target bandwidth, where the SDT procedure is a data transmission procedure in an inactive state of the terminal device.

In an optional implementation, the target bandwidth includes an initial UL BWP and an initial DL BWP, and the initial DL BWP has a CORESET #0.

In an optional implementation, the RACH includes a 4-step RACH, and the transmitting module 1501 is configured to receive, on the initial UL BWP, at least one of a preamble, a Msg3, a Msg3 retransmission, or an UL transmission dynamically scheduled by the network device transmitted by the terminal device.

In an optional implementation, the RACH includes a 4-step RACH, and the transmitting module 1501 is configured to transmit to the terminal device on the CORESET #0 in the initial DL BWP at least one of an RAR, a Msg3 retransmission indication, or a message 4 (Msg4).

In an optional implementation, the transmitting module 1501 is configured to transmit a resource scheduling on the initial DL BWP when the Msg4 includes a contention resolution message and does not include a radio resource control (RRC) release message, where the resource scheduling includes at least one of an UL scheduling or a DL scheduling.

In an optional implementation, the initial DL BWP further has a first CORESET and/or a first search space, where the first CORESET is a CORESET configured for the terminal device in the initial DL BWP, and the first search space is a search space configured for the terminal device in the initial DL BWP. The transmitting module 1501 is configured to transmit a resource scheduling on the first CORESET and/or the first search space when the Msg4 includes a contention resolution message and does not include an RRC release message, where the resource scheduling includes at least one of an UL scheduling or a DL scheduling.

In an optional implementation, the RACH includes a 2-step RACH, and the transmitting module 1501 is configured to receive, on the initial UL BWP, at least one of a preamble, a MsgA payload, a Msg3, a Msg3 retransmission, or an UL transmission dynamically scheduled by the network device transmitted by the terminal device.

In an optional implementation, the RACH includes a 2-step RACH, and the transmitting module 1501 is configured to transmit to the terminal device on the CORESET #0 in the initial DL BWP at least one of an RAR, a Msg3 retransmission indication, a Msg4, or a MsgB.

In an optional implementation, the transmitting module 1501 is configured to transmit a resource scheduling on the initial DL BWP when the MsgB includes a contention resolution message and does not include an RRC release message, where the resource scheduling includes at least one of an UL scheduling or a DL scheduling; or transmit a resource scheduling on the initial DL BWP when the Msg4 includes a contention resolution message and does not includes an RRC release message, where the resource scheduling includes at least one of an UL scheduling or a DL scheduling.

In an optional implementation, the initial DL BWP further has a first CORESET and/or a first search space, where the first CORESET is a CORESET configured for the terminal device in the initial DL BWP, and the first search space is a search space configured for the terminal device in the initial DL BWP. The transmitting module 1501 is configured to transmit a resource scheduling on the first CORESET and/or the first search space when the MsgB includes a contention resolution message and does not include an RRC release message, where the resource scheduling includes at least one of an UL scheduling or a DL scheduling; or transmit a resource scheduling on the first CORESET and/or the first search space when the Msg4 includes a contention resolution message and does not include an RRC release message, where the resource scheduling includes at least one of an UL scheduling or a DL scheduling.

In an optional implementation, the UL scheduling and the DL scheduling belong to the same RACH-based SDT procedure.

In an optional implementation, the first CORESET and/or the first search space is determined based on an SIB1 scheduled by the CORESET #0.

In an optional implementation, the initial UL BWP and the initial DL BWP are determined based on the SIB1 scheduled by the CORESET #0.

In an optional implementation, the target bandwidth includes a first UL BWP and a first DL BWP, and the first UL BWP and the first DL BWP are BWPs configured for the terminal device and dedicated for the RACH-based SDT procedure.

In an optional implementation, the RACH includes a 4-step RACH, and the transmitting module 1501 is configured to receive, on the first UL BWP, at least one of a preamble, a Msg3, a Msg3 retransmission, or an UL transmission dynamically scheduled by the network device transmitted by the terminal device.

In an optional implementation, the RACH includes a 4-step RACH, and the transmitting module 1501 is configured to transmit to the terminal device on the first DL BWP at least one of an RAR, a Msg3 retransmission indication, an UL scheduling, a DL scheduling, or a Msg4.

In an optional implementation, the RACH includes a 2-step RACH, and the transmitting module 1501 is configured to receive, on the first UL BWP, at least one of a preamble, a MsgA payload, a Msg3, a Msg3 retransmission, or an UL transmission dynamically scheduled by the network device transmitted by the terminal device.

In an optional implementation, the RACH includes a 2-step RACH, and the transmitting module 1501 is configured to transmit to the terminal device on the first DL BWP at least one of an RAR, a Msg3 retransmission indication, a Msg4, an UL scheduling, a DL scheduling, or a MsgB.

In an optional implementation, the UL scheduling and the DL scheduling belong to the same RACH-based SDT procedure.

In an optional implementation, the first UL BWP and the first DL BWP are determined based on an SIB1 scheduled by a CORESET #0.

Figure 16:
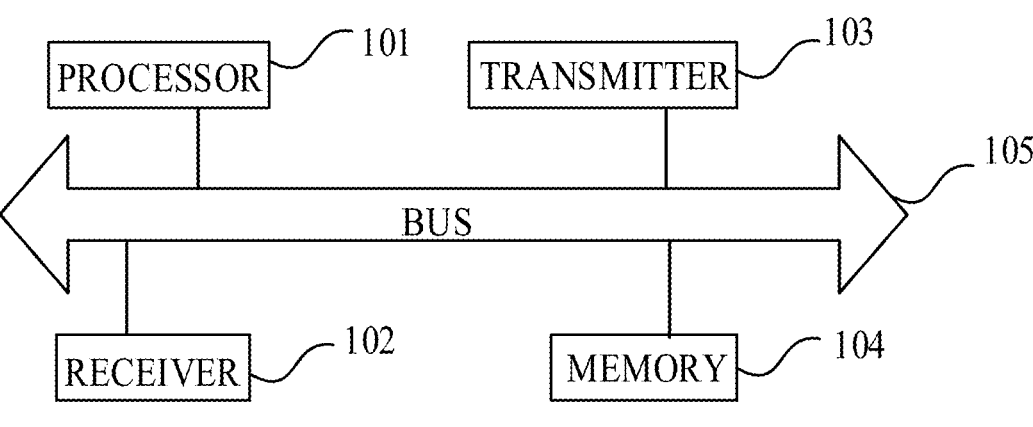
FIG. 16 is a schematic structural diagram of a communication device provided in an exemplary implementation of the disclosure.

FIG. 16 is a schematic structural diagram of a communication device (a terminal device or a network device) provided in an exemplary implementation of the disclosure. The communication device includes a processor 101, a receiver 102, a transmitter 103, a memory 104, and a bus 105.

The processor 101 includes one or more processing cores, and the processor 101 executes various function applications and information processing by running software programs and modules.

The receiver 102 and the transmitter 103 may be implemented as a communication assembly, where the communication assembly may be a communication chip.

The memory 104 is coupled with the processor 101 through the bus 105.

The memory 104 may be configured to store at least one instruction. The processor 101 is configured to execute the at least one instruction to implement various steps in the foregoing method implementations.

In addition, the memory 104 may be implemented by any type of volatile or nonvolatile storage device or combination thereof. The volatile or non-volatile storage device includes, but is not limited to, a magnetic disk or an optical disk, an electrically-erasable programmable read only memory (EE-PROM), an erasable programmable ROM (EPROM), a static random access memory (SRAM), a ROM, a magnetic memory, a flash memory, a PROM.

When a computer device is implemented as a terminal device, a processor and a transceiver in the computer device involved in implementations of the disclosure can execute the steps performed by the terminal device in the method illustrated in any one of FIG. 4 to FIG. 13 described above, which will not be repeated herein.

In a possible implementation, the computer device is implemented as a terminal device. The processor is configured to determine a target bandwidth used for a RACH-based SDT procedure. The transceiver is configured to perform the RACH-based SDT procedure with a network device on the target bandwidth, where the SDT procedure is a data transmission procedure in an inactive state of the terminal device.

When a computer device is implemented as a network device, a processor and a transceiver in the computer device involved in implementations of the disclosure can execute the steps performed by the network device in the method illustrated in any one of FIG. 4 to FIG. 13 described above, which will not be repeated herein.

In a possible implementation, the computer device is implemented as a network device. The transceiver is configured to perform a RACH-based SDT procedure with a terminal device on a target bandwidth, where the SDT procedure is a data transmission procedure in an inactive state of the terminal device.

In an exemplary implementation, a computer-readable storage medium is further provided. The computer-readable storage medium is configured to store at least one instruction, at least one program, a code set, or an instruction set which is loaded and executed by a processor to implement the method for data transmission that is executed by the communication device and provided in the foregoing method implementations.

In an exemplary implementation, a chip is further provided. The chip includes a programmable logic circuit or a program instruction. The chip, when run on the computer device, is configured to implement the method for data transmission described in the above aspects.

In an exemplary implementation, a computer program product is further provided. The computer program product, when executed on a processor of the computer device, is operable with the computer device to implement the method for data transmission described in the above aspects.

Those of ordinary skill in the art may understand that all or some of the steps of the foregoing implementations may be implemented by hardware, and may also be implemented by a program instructing relevant hardware. The program may be stored in a computer-readable storage medium. The storage medium may be a ROM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for data transmission, applied to a terminal device, the method comprising:

determining a target bandwidth used for a random access channel (RACH)-based small data transmission (SDT) procedure, wherein the determining comprises: determining an initial uplink (UL) bandwidth part (BWP) and an initial downlink (DL) BWP as the target bandwidth, wherein the initial DL BWP has a control resource set #0 (CORESET #0); and performing the RACH-based SDT procedure with a network device on the target bandwidth, wherein the RACH comprises a 4-step RACH, and the performing comprises: receiving, on the CORESET #0 in the initial DL BWP, at least one of a random access response (RAR), a message 3 (Msg3) retransmission indication, or a message 4 (Msg4) transmitted by the network device, or wherein the RACH comprises a 2-step RACH, and the performing comprises: receiving, on the CORESET #0 in the initial DL BWP, at least one of an RAR, a Msg3 retransmission indication, a Msg4, or a message B (MsgB) transmitted by the network device;

wherein the SDT procedure is a data transmission procedure in an inactive state of the terminal device.

2. The method of claim 1, wherein the initial UL BWP and the initial DL BWP are determined based on the system information block 1 (SIB1) scheduled by the CORESET #0.

3. The method of claim 1, wherein when the RACH comprises the 4-step RACH;

the initial DL BWP further has a first CORESET and/or a first search space, wherein the first CORESET is a CORESET configured for the terminal device in the initial DL BWP, and the first search space is a search space configured for the terminal device in the initial DL BWP; and the method further comprises:

receiving a resource scheduling on the first CORESET and/or the first search space when the Msg4 comprises a contention resolution message and does not comprise an RRC release message, wherein the resource scheduling comprises at least one of an UL scheduling or a DL scheduling.

4. The method of claim 3, wherein the UL scheduling and the DL scheduling belong to the same RACH-based SDT procedure.

5. The method of claim 3, wherein the first CORESET and/or the first search space is determined based on a system information block 1 (SIB1) scheduled by the CORESET #0.

6. The method of claim 1, wherein when the RACH comprises the 2-step RACH;

the initial DL BWP further has a first CORESET and/or a first search space, wherein the first CORESET is a CORESET configured for the terminal device in the initial DL BWP, and the first search space is a search space configured for the terminal device in the initial DL BWP; and the method further comprises:

receiving a resource scheduling on the first CORESET and/or the first search space when the MsgB comprises a contention resolution message and does not comprise an RRC release message, wherein the resource scheduling comprises at least one of an UL scheduling or a DL scheduling; or receiving a resource scheduling on the first CORESET and/or the first search space when the Msg4 comprises a contention resolution message and does not comprise an RRC release message, wherein the resource scheduling comprises at least one of an UL scheduling or a DL scheduling.

7. A method for data transmission, applied to a network device, the method comprising:

performing a random access channel (RACH)-based small data transmission (SDT) procedure with a terminal device on a target bandwidth;

wherein the target bandwidth comprises an initial uplink (UL) bandwidth part (BWP) and an initial downlink (DL) BWP, and the initial DL BWP has a control resource set #0 (CORESET #0);

wherein the SDT procedure is a data transmission procedure in an inactive state of the terminal device;

wherein the RACH comprises a 4-step RACH, and the performing comprises:

transmitting to the terminal device on the CORESET #0 in the initial DL BWP at least one of a random access response (RAR), a message 3 (Msg3) retransmission indication, or a message 4 (Msg4); or wherein the RACH comprises a 2-step RACH, and the performing comprises:

transmitting to the terminal device on the CORESET #0 in the initial DL BWP at least one of an RAR, a Msg3 retransmission indication, a Msg4, or a message B (MsgB).

8. The method of claim 7, wherein when the RACH comprises the 4-step RACH:

the initial DL BWP further has a first CORESET and/or a first search space, wherein the first CORESET is a CORESET configured for the terminal device in the initial DL BWP, and the first search space is a search space configured for the terminal device in the initial DL BWP; and the method further comprises:

transmitting a resource scheduling on the first CORESET and/or the first search space when the Msg4 comprises a contention resolution message and does not comprise an RRC release message, wherein the resource scheduling comprises at least one of an UL scheduling or a DL scheduling.

9. The method of claim 8, wherein the UL scheduling and the DL scheduling belong to the same RACH-based SDT procedure.

10. The method of claim 8, wherein the first CORESET and/or the first search space is determined based on a system information block 1 (SIB1) scheduled by the CORESET #0.

11. The method of claim 7, wherein the RACH comprises the 2-step RACH;

the initial DL BWP further having a first CORESET and/or a first search space, wherein the first CORESET is a CORESET configured for the terminal device in the initial DL BWP, and the first search space is a search space configured for the terminal device in the initial DL BWP; and wherein the method further comprises:

transmitting a resource scheduling on the first CORESET and/or the first search space when the MsgB comprises a contention resolution message and does not comprise an RRC release message, or transmitting a resource scheduling on the first CORESET and/or the first search space when the Msg4 comprises a contention resolution message and does not comprise an RRC release message, wherein the resource scheduling comprises at least one of an UL scheduling or a DL scheduling.

12. The method of claim 7, wherein the initial UL BWP and the initial DL BWP are determined based on the SIB1 scheduled by the CORESET #0.

13. A terminal device, comprising:

a processor; and a memory configured to store executable program codes of the processor:

wherein the processor is configured to execute the executable program codes to cause the terminal device to:

determine a target bandwidth used for a random access channel (RACH)-based small data transmission (SDT) procedure, wherein an initial uplink (UL) bandwidth part (BWP) and an initial downlink (DL) BWP are determined as the target bandwidth, wherein the initial DL BWP has a control resource set #0 (CORESET #0); and perform the RACH-based SDT procedure with a network device on the target bandwidth, wherein the RACH comprises a 4-step RACH, and the terminal device caused to perform the RACH-based SDT procedure is caused to: receive, on the CORESET #0 in the initial DL BWP, at least one of a random access response (RAR), a message 3 (Msg3) retransmission indication, or a message 4 (Msg4) transmitted by the network device, or wherein the RACH comprises a 2-step RACH, and the terminal device caused to perform the RACH-based SDT procedure is caused to: receive, on the CORESET #0 in the initial DL BWP, at least one of an RAR, a Msg3 retransmission indication, a Msg4, or a message B (MsgB transmitted by the network device;

wherein the SDT procedure is a data transmission procedure in an inactive state of the terminal device.

14. The terminal device of claim 13, wherein when the RACH comprises the 4-step RACH, the initial DL BWP further has a first CORESET and/or a first search space, wherein the first CORESET is a CORESET configured for the terminal device in the initial DL BWP, and the first search space is a search space configured for the terminal device in the initial DL BWP; and the terminal device is further caused to:

receive a resource scheduling on the first CORESET and/or the first search space when the Msg4 comprises a contention resolution message and does not comprise an RRC release message, wherein the resource scheduling comprises at least one of an UL scheduling or a DL scheduling.

15. The terminal device of claim 14, wherein the UL scheduling and the DL scheduling belong to the same RACH-based SDT procedure.

16. The terminal device of claim 14, wherein the first CORESET and/or the first search space is determined based on a system information block 1 (SIB1) scheduled by the CORESET #0.

17. The terminal device of claim 13, wherein when the RACH comprises the 2-step RACH, the initial DL BWP further has a first CORESET and/or a first search space, wherein the first CORESET is a CORESET configured for the terminal device in the initial DL BWP, and the first search space is a search space configured for the terminal device in the initial DL BWP; and the terminal device is further caused to:

receive a resource scheduling on the first CORESET and/or the first search space when the MsgB comprises a contention resolution message and does not comprise an RRC release message, wherein the resource scheduling comprises at least one of an UL scheduling or a DL scheduling; or receive a resource scheduling on the first CORESET and/or the first search space when the Msg4 comprises a contention resolution message and does not comprise an RRC release message, wherein the resource scheduling comprises at least one of an UL scheduling or a DL scheduling.

18. The terminal device of claim 13, wherein the initial UL BWP and the initial DL BWP are determined based on the SIB1 scheduled by the CORESET #0.

19. A network device, comprising:

a processor; and a memory configured to store executable program codes of the processor;

wherein the processor is configured to execute the executable program codes to cause the network device to perform the method of claim 7.

\* \* \* \* \*